United States Patent [19]

Schröder

[11] Patent Number: 4,676,904
[45] Date of Patent: Jun. 30, 1987

[54] FILTER SHEET WHICH IS FREE OF ASBESTOS

[75] Inventor: Jobst Schröder, Bad Kreuznach, Fed. Rep. of Germany

[73] Assignees: Seitz-Filter-Werke Theo; Geo Seitz GmbH und Co., both of Bad Kreuznach, Fed. Rep. of Germany

[21] Appl. No.: 640,506

[22] Filed: Aug. 13, 1984

[30] Foreign Application Priority Data

Aug. 13, 1983 [DE] Fed. Rep. of Germany ....... 3329385

[51] Int. Cl.$^4$ .............................................. B01D 39/18
[52] U.S. Cl. ..................... 210/504; 210/506; 210/508; 428/248; 55/524; 55/528
[58] Field of Search ............... 210/777, 488, 500.1, 210/503, 504, 506, 505, 508; 428/248, 279, 308.8, 311.7, 326, 533; 55/524, 528

[56] References Cited

U.S. PATENT DOCUMENTS

| 2,687,447 | 8/1954 | Merrill | 210/503 |
| 3,149,023 | 9/1964 | Bodendorf et al. | 210/503 |
| 3,192,154 | 6/1965 | Burton | 210/503 |
| 3,250,704 | 5/1966 | Lorendusky | 210/503 |
| 3,251,475 | 5/1966 | Till et al. | 210/503 |
| 4,007,113 | 2/1977 | Ostreicher | 210/504 |
| 4,190,532 | 2/1980 | Halbfoster | 210/504 |
| 4,313,832 | 2/1982 | Shimizu et al. | 210/505 |
| 4,360,433 | 11/1982 | Walker et al. | 210/504 |
| 4,511,473 | 4/1985 | Hou | 210/505 |

FOREIGN PATENT DOCUMENTS 2910289 9/1980 Fed. Rep. of Germany .
3010581 11/1980 Fed. Rep. of Germany .
3030118 2/1981 Fed. Rep. of Germany .

Primary Examiner—Richard V. Fisher
Assistant Examiner—Wanda L. Millard
Attorney, Agent, or Firm—Becker & Becker, Inc.

[57] ABSTRACT

A filter sheet which is free of asbestos, and which contains cellulose, filtering aids such as diatomite, perlite, etc., and cationically modified material in the form of cellulose on which are chemically bound cationic chemical groups having a degree of substitution between 0.01 and 0.05. The rate of flow and the clarity effect are correlated to the degree of substitution of the utilized cationically modified cellulose, and the pigment adsorption, i.e. the adsorptive properties of the filter sheet, are correlated to the percent by weight of the cationically modified cellulose to the total amount of cellulose contained in the filter sheet. By utilization of these correlations, modified asbestos-free filter sheets can be produced which are adapted to given applications.

9 Claims, No Drawings

FILTER SHEET WHICH IS FREE OF ASBESTOS

FIELD OF THE INVENTION

The present invention relates to a filter sheet which is free of asbestos, and which contains cellulose of, for example, pine and/or leaf wood fibers, filtering aids such as kieselguhr (diatomite or diatomaceous earth), perlite, and the like, and cationically modified material.

DESCRIPTION OF PRIOR ART

German Offenlegungsschriften No. 2,910,289, 3,010,581, and 3,030,118 disclose the synthesis of asbestos-free filters with cellulose fibers and fillers, such as diatomite, perlite, aluminum oxide, silicon dioxide, etc, which have a filtering effect. For example, cationic polyamide-polyamine epichlorhydrin (epoxy) resins have been used in order to bind together the constituents, especially the cellulose fibers, which are combined in the filter sheet. Such a cationic resin must be present to a sufficient extent in order to impart a positive zeta potential to at least the fibers and/or the particle-like material. The fiber-like and/or particle-like filter material is at least partially enveloped with such cationic resin, so that the surface properties of this enveloped or encased material must be relinquished in favor of the action of the cationic material. A further drawback of these heretofore known filter sheets is that the fibrous or particle-like filter material is held in a rigid frame formed by the resin, and the porosity properties of the filter sheet are therefore adversely affected when the material is acted upon with liquid and expansion thereby occurs. Furthermore, the resin coating on the fibers and particles of solid material tends to partially break open and form defects when the fibers and particles of solid material expand. These disadvantageous phenomena appear particularly intensely when the filter sheets are steamed and washed, and can diminish the effectiveness of the filter sheet.

In contrast, an object of the present invention is to substantially improve asbestos-free filter sheets having cationic constituents to such an extent that the expansion of constituents provided in the filter sheet does not lead to substantial alteration of the natural filter porosity, and also has no disadvantageous affect on the binding of the cationic constituents to the fibrous and particle-like filter components. In particular, the filter sheet should be capable of being repeatedly steamed and cleaned by being washed without this having an adverse affect on its effectiveness.

These objects, and other objects and advantages of the present invention will appear more clearly from the following specification and examples.

SUMMARY OF THE INVENTION

The filter sheet of the present invention is characterized primarily in that as cationically modified material, there is provided cellulose which is in fibrous and/or fine or microfibrous and/or granulated and/or pulverized form, and on which are chemically bound cationic chemical groups having a degree of substitution in a range of between 0.01 and 0.05; this cationically modified cellulose represents all or a portion of the cellulose which is contained in the filter sheet, and has a Schopper-Riegler degree of pulverization or fineness in a range of between approximately 20° and 60°.

The invention filter sheet is distinguished by increased boundary layer activity properties. This filter sheet produces a significant improvement of a separation of microorganisms, and is particularly suitable for retaining fine materials in the sheet.

Furthermore, the inventive asbestos-free filter sheet has good adsorption properties which, as a function of the degree of substitution of the cationically modified cellulose, can be varied for the respective application of the filter sheet. The inventive filter sheet is further characterized by good pyrogenic and pigment retention. This property too can be adjusted as a function of the degree of substitution of the cationically modified cellulose which is being used for the respective application. The inventive filter sheet has a considerably extended service life while providing the same clarifying effect. This extension of the service life is again dependent upon the degree of substitution of the cationically modified cellulose used in the filter sheet, and in particular in such a way that filter sheets having a longer service life are obtained with cationically modified cellulose having a higher degree of substitution than with cationically modified cellulose having a lesser degree of substitution.

A further advantage obtained with the inventive filter sheet is an improved clarifying effect while still maintaining a good rate of flow. Due to the chemical binding of the cationic chemical groups in the cellulose by substitution, substantially improved regeneration properties of the filter sheet are obtained.

The cationically modified cellulose of the inventive filter sheet can preferably be a 2-hydroxy-trimethylammoniumpropylcellulose-chloride. Other cationically modified material or means which can inventively be used include cellulose fibers which are cationically modified with 2,3-epoxypropyltrimethylammoniumchloride. The utilization of such cationically modified celluloses having the aforementioned range for the degree of substitution offers, in addition to the previously mentioned advantages for the filter sheet, also the additional advantage of improving the retention of the filtering aids within the filter sheet and thereby also improving the mechanical and filtering properties of the filter sheet.

A composition for the filter sheet which is advantageous for practical purposes essentially comprises, for example, up to 60° by weight pulverous filtering aids, such as diatomite, perlite, etc., 10 to 40% short fibered to microfibrous ground, cationically modified cellulose, and as a balance, longer-fibered filter-active leaf-forming material. The latter can be non-cationically modified cellulose, cationically modified cellulose, or even polyolefin fibers and the like. The long-fibered leaf-forming material can also be a mixture of various materials, for example of those mentioned above.

A preferred example which is within the scope of the present invention is cellulose of pine and/or leaf wood as a base for the cationically modified cellulose and/or the long-fibered leaf-forming material.

If the filter sheets are to be used for treating beverages, it is advisable either during or after the formation of the filter sheet to undertake an acid wash at a pH of 2.5 to 1.5.

EXAMPLE 1

Asbestos-free filter sheets were produced in a conventional manner from the following essential constituents:

25% by weight pine wood cellulose, untreated and ground to a Schopper-Riegler (SR) degree of pulverization of 40°.

25% by weight cationically modified, short-fibered leaf wood cellulose, and

50% by weight diatomite.

Four different filter sheets were produced which differed in the degree of substitution of the cationically modified cellulose which was used:

filter sheet 1.1 having short-fibered leaf wood cellulose, and substituted with 2,3-epoxypropyltrimethylammoniumchloride at a degree of substitution DS=0.017.

filter sheet 1.2 having short-fibered leaf wood cellulose, and substituted with 2,3-epoxypropyltrimethylammoniumchloride at a degree of substitution DS=0.021.

filter sheet 1.3 having short-fibered leaf wood cellulose, and substituted with 2,3-epoxypropyltrimethylammoniumchloride at a degree of substitution DS=0.026 and filter sheet 1.4 having short-fibered leaf wood cellulose, and substituted with 2,3-epoxypropyltrimethylammoniumchloride at a degree of substitution DS=0.038.

These filter sheets were subjected to the same tests, namely with water and turbid liquid. The test with turbid liquid was accomplished on a filter area of 100 cm² over a first time period of 30 minutes at a filtering pressure of 0.5 bar, and subsequently over a time period of 30 minutes at a filtering pressure of 1.0 bar. The quantity of the liquid which passed through the filter area of 100 cm² under these conditions were measured. The clarity effect in % Sine of the filtrate obtained was measured.

The tests showed that, with these filter sheets, the rate of flow with water as well as the rate of flow with turbid liquid increased as the degree of substitution of the cationically modified cellulose which was used increased. Similarly, the clarity effect increases as the degree of substitution of the utilized cationically modified cellulose increases.

The results are summarized in Table 1.

modified cellulose was short-fibered leaf wood cellulose which was substituted with 2,3-epoxypropyltrimethylammoniumchloride at a degree of substitution DS=0.023.

The four filter sheets differ in the ratio of the quantity of untreated cellulose to the quantity of cationically modified cellulose, as follows:

Filter sheet 2.1, 37.5% by weight untreated cellulose, 12.5% by weight cationically modified cellulose, and 50% by weight diatomite.

Filter sheet 2.2, 25% by weight untreated cellulose, 25% by weight cationically modified cellulose, and 50% by weight diatomite.

Filter sheet 2.3, 12.5% by weight untreated cellulose, 37.5% cationically modified cellulose, and 50% by weight diatomite.

Filter sheet 2.4, no untreated cellulose, 50% by weight cationically modified cellulose, and 50% by weight diatomite.

Tests were conducted on these four filter sheets with regard to their rate of flow with water, their rate of flow with turbid liquid, and their pigment adsorption. The pigment adsorption test clearly shows the adsorptive properties of the filter sheets. For this purpose, a filter area of 20 cm² received a pigment suspension in water at a filtration pressure of $\delta p = 1$ bar. The quantity of liquid which passed through the filter sheet before pigment escaped was measured in milliliters (ml).

The following Table 2 contains the test results of Example 2. All four filter sheets showed a good rate of flow with water and a good rate of flow with turbid liquid. No dependence of the rate of flow on the ratio of the quantity of untreated cellulose to cationically modified cellulose was demonstrated. In contrast, it was shown that the pigment adsorption increased considerably as the relative quantity of the cationically modified cellulose increased. The conclusion to be drawn from this is that the adsorptive properties of the filter sheet increase as the quantity of cationically modified cellulose increases.

The present invention is, of course, in no way restricted to the specific enclosure of the specification and examples, but also encompasses any modifications within the scope of the appended claims.

TABLE 1

| Filter sheet number | Cellulose % untreated 40° SR | Cellulose % cationically modified short-fibered/DS | Diatomite (%) | Rate of flow with water ($1 \, m^{-2} \, min^{-1}$) | Rate of flow with turbid liquid (l) | clarity effect (% Sine) |
|---|---|---|---|---|---|---|
| 1.1 | 25 | 25  0.017 | 50 | 103 | 14.4 | 6.5 |
| 1.2 | 25 | 25  0.021 | 50 | 105 | 12.5 | 6.0 |
| 1.3 | 25 | 25  0.026 | 50 | 125 | 16.4 | 7.5 |
| 1.4 | 25 | 25  0.038 | 50 | 129 | 18.1 | 8.0 |

TABLE 2

| Filter sheet number | Cellulose % untreated 45° SR | Cellulose % cationically modified DS 0.023 | Diatomite (%) | Rate of flow with water ($1 \, m^{-2} \, min^{-1}$) | Rate of flow with turbid liquid (l) | Rate of flow with turbid liquid (% Sine) | Pigment adsorption (ml) |
|---|---|---|---|---|---|---|---|
| 2.1 | 37.5 | 12.5 | 50 | 166 | 13.5 | 12.5 | 180 |
| 2.2 | 25 | 25 | 50 | 219 | 15.1 | 15.0 | 290 |
| 2.3 | 12.5 | 37.5 | 50 | 204 | 17.6 | 11.5 | 360 |
| 2.4 | — | 50 | 50 | 181 | 15.5 | 12.5 | 460 |

EXAMPLE 2

Four filter sheets were produced in a conventional manner from untreated pine wood cellulose having a degree of pulverization of 45° SR, cationically modified cellulose, and diatomite. The employed cationically

What I claim is:

1. In a filter sheet having a considerably extended service life accompanied by maintaining of clarifying effect and which is free of asbestos and contains cellulose, filtering aids and cationically modified material;

the improvement therewith comprising as said cationically modified material, at least one cellulose which is selected from the group consisting of fibrous cellulose, fine-fibered to micro-fibrous cellulose, granulated cellulose, and pulverized cellulose, and cationic chemical groups chemically bound to said cellulose and having a degree of substitution in a range of between 0.01 and 0.05; wherein said cationically modified cellulose represents at least a portion of the cellulose contained in said filter sheet, and has a Schopper-Riegler degree of pulverization in a range of between approximately 20° and 60°, said filter sheet having increased boundary layer activity properties as well as producing significant improvement of a separation of microorganisms and being particularly suitable for retaining fine materials in the sheet as well as being capable of being repeatedly steamed and cleaned by being washed without having any adverse affect upon filtering effectiveness thereof for good pyrogenic and pigment retention, said cationically modified cellulose being a 2-hydroxy-trimethylammoniumpropyl-cellulose-chloride.

2. In a filter sheet having a considerably extended service life accompanied by maintaining of clarifying effect and which is free of asbestos and contains cellulose, filtering aids and cationically modified material;
the improvement therewith comprising as said cationically modified material, at least one cellulose which is selected from the group consisting of fibrous cellulose, fine-fibered to micro-fibrous cellulose, granulated cellulose, and pulverized cellulose, and cationic chemical groups chemically bound to said cellulose and having a degree of substitution in a range of between 0.01 and 0.05; wherein said cationically modified cellulose represents at least a portion of the cellulose contained in said filter sheet, and has a Schopper-Riegler degree of pulverization in a range of between approximately 20° and 60°, said filter sheet having increased boundary layer activity properties as well as producing significant improvement of a separation of microorganisms and being particularly suitable for retaining fine materials in the sheet as well as being capable of being repeatedly steamed and cleaned by being washed without having any adverse affect upon filtering effectiveness thereof for good pyrogenic and pigment retention, said cationically modified cellulose having been substitution treated with 2,3-epoxypropyltrimethyl-ammoniumchloride.

3. A filter sheet according to claim 2, which contains up to 60% by weight pulverous filtering aids, 10 to 40% by weight short-fibered to micro-fibrous, ground cationically modified cellulose, and as the balance long-fibered, filter-active, leaf-forming material.

4. In a filter sheet having a considerably extended service life accompanied by maintaining of clarifying effect and which is free of asbestos and contains cellulose, filtering aids and cationically modified material;
the improvement therewith comprising as said cationically modified material, at least one cellulose which is selected from the group consisting of fibrous cellulose, fine-fibered to micro-fibrous cellulose, granulated cellulose, and pulverized cellulose, and cationic chemical groups chemically bound to said cellulose and having a degree of substitution in a range of between 0.01 and 0.05; wherein said cationically modified cellulose represents at least a portion of the cellulose contained in said filter sheet, and has a Schopper-Riegler degree of pulverization in a range of between approximately 20° and 60°, said filter sheet having increased boundary layer activity properties as well as producing significant improvement of a separation of microorganisms and being particularly suitable for retaining fine materials in the sheet as well as being capable of being repeatedly steamed and cleaned by being washed without having any adverse affect upon filtering effectiveness thereof for good pyrogenic and pigment retention; said filter sheet containing up to 60% by weight pulverous filtering aids, 10 to 40% by weight short-fibered to micro-fibrous, ground cationically modified cellulose, and as the balance long-fibered, filter-active, leaf-forming material, said long-fibered leaf-forming material containing polyolefin fibers.

5. A filter sheet according to claim 4, in which said long-fibered leaf-forming material contains non-cationically modified cellulose.

6. A filter sheet according to claim 4, in which said long-fibered leaf-forming material contains cationically modified cellulose.

7. In a filter sheet having a considerably extended service life accompanied by maintaining of clarifying effect and which is free of asbestos and contains cellulose, filtering aids and cationically modified material;
the improvement therewith comprising as said cationically modified material, at least one cellulose which is selected from the group consisting of fibrous cellulose, fine-fibered to micro-fibrous cellulose, granulated cellulose, and pulverized cellulose, and cationic chemical groups chemically bound to said cellulose and having a degree of substitution in a range of between 0.01 and 0.05; wherein said cationically modified cellulose represents at least a portion of the cellulose contained in said filter sheet, and has a Schopper-Riegler degree of pulverization in a range of between approximately 20° and 60°, said filter sheet having increased boundary layer activity properties as well as producing significant improvement of a separation of microorganisms and being particularly suitable for retaining fine materials in the sheet as well as being capable of being repeatedly steamed and cleaned by being washed without having any adverse affect upon filtering effectiveness thereof for good pyrogenic and pigment retention; said filter sheet containing up to 60% by weight pulverous filtering aids, 10 to 40% by weight short-fibered to micro-fibrous, ground cationically modified cellulose, and as the balance long-fibered, filter-active, leaf-forming material, which includes, as a base for at least one of said cationically modified cellulose and said long-fibered leaf-forming material, cellulose of at least one of the group selected from pine wood and leaf wood.

8. In a filter sheet having a considerably extended service life accompanied by maintaining of clarifying effect and which is free of asbestos and contains cellulose, filtering aids and cationically modified material;
the improvement therewith comprising as said cationically modified material, at least one cellulose which is selected from the group consisting of fibrous cellulose, fine-fibered to micro-fibrous cellulose, granulated cellulose, and pulverized cellulose, and cationic chemical groups chemically bound to said cellulose and having a degree of substitution in a range of between 0.01 and 0.05; wherein said cationically modified cellulose represents at least a portion of the cellulose contained in said filter sheet, and has a Schopper-Riegler degree of pulverization in a range of between approximately 20° and 60°, said filter sheet having increased boundary layer activity properties as well as producing significant improvement of a separation of microorganisms and being particularly suitable for retaining fine materials in the sheet as well as being capable of being repeatedly steamed and cleaned by being washed without having any adverse affect upon filtering effectiveness thereof for good pyrogenic and pigment retention, said filter sheet containing up to 60% by weight pulverous filtering aids, 10 to 40% by weight short-fibered to microfibrous, ground cationically modified cellulose, and as the balance long-fibered, filter-active, leaf-forming material, said long-fibered leaf-forming material containing a mixture of non-cationically modified cellulose, cationically modified cellulose, and polyolefin fibers.

9. The filter sheet of any of claims 1, 2, 4, 8, or 7 in which the filtering aid is selected from the group consisting of diatomite and perlite.

* * * * *

UNITED STATES PATENT AND TRADEMARK OFFICE
CERTIFICATE OF CORRECTION

PATENT NO. :   4,676,904
DATED      :   30 June 1987
INVENTOR(S) :  JOBST SCHRÖDER It is certified that error appears in the above-identified patent and that said Letters Patent is hereby corrected as shown below:

On the title-abstract page, please correct the Assignee name to read as follows:

[73] Assignee: SEITZ-FILTER-WERKE Theo & Geo Seitz GmbH und Co. of D-6550 Bad Kreuznach Federal Republic of Germany Signed and Sealed this Seventeenth Day of November, 1987

Attest:

DONALD J. QUIGG

Attesting Officer

Commissioner of Patents and Trademarks